(12) United States Patent
McDaniel et al.

(10) Patent No.: US 11,220,564 B2
(45) Date of Patent: Jan. 11, 2022

(54) METHODS OF PREPARING A CATALYST

(71) Applicant: Chevron Phillips Chemical Company LP, The Woodlands, TX (US)

(72) Inventors: Max P. McDaniel, Bartlesville, OK (US); Kathy S. Clear, Bartlesville, OK (US); Eric D. Schwerdtfeger, Bartlesville, OK (US); Jeremy M. Praetorius, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 130 days.

(21) Appl. No.: 16/571,281

(22) Filed: Sep. 16, 2019

(65) Prior Publication Data

US 2020/0010587 A1    Jan. 9, 2020

Related U.S. Application Data

(62) Division of application No. 15/816,145, filed on Nov. 17, 2017, now Pat. No. 10,513,570.

(51) Int. Cl.

| *C08F 110/02* | (2006.01) |
|---|---|
| *B01J 21/08* | (2006.01) |
| *B01J 37/08* | (2006.01) |
| *B01J 37/02* | (2006.01) |
| *C08F 4/18* | (2006.01) |
| *C08F 4/24* | (2006.01) |
| *B01J 21/06* | (2006.01) |
| *B01J 23/26* | (2006.01) |

(52) U.S. Cl.
CPC .......... *C08F 110/02* (2013.01); *B01J 21/063* (2013.01); *B01J 21/08* (2013.01); *B01J 23/26* (2013.01); *B01J 37/0203* (2013.01); *B01J 37/0205* (2013.01); *B01J 37/0207* (2013.01); *B01J 37/0213* (2013.01); *B01J 37/086* (2013.01); *C08F 4/18* (2013.01); *C08F 4/24* (2013.01)

(58) Field of Classification Search
CPC .......... C08F 110/02; B01J 23/26; B01J 21/08
See application file for complete search history.

(56) References Cited

U.S. PATENT DOCUMENTS

| 2,621,193 A * | 12/1952 | Langkammerer ... D06M 13/503 554/72 |
|---|---|---|
| 2014/0275458 A1 * | 9/2014 | McDaniel ............... C08F 10/00 526/194 |
| 2018/0094087 A1 * | 4/2018 | McDaniel ............... C08F 10/02 |

* cited by examiner

*Primary Examiner* — Catherine S Branch
(74) *Attorney, Agent, or Firm* — Conley Rose, P.C.

(57) ABSTRACT

A method of preparing a catalyst comprising a) contacting a non-aqueous solvent, a carboxylic acid, and a chromium-containing compound to form an acidic mixture; b) contacting a titanium-containing compound with the acidic mixture to form a titanium treatment solution; c) contacting a pre-formed silica-support comprising from about 0.1 wt. % to about 20 wt. % water with the titanium treatment solution to form a pre-catalyst; and d) thermally treating the pre-catalyst to form the catalyst. A method of preparing a catalyst comprising a) contacting a non-aqueous solvent and a carboxylic acid to form an acidic mixture; b) contacting a titanium-containing compound with the acidic mixture to form a titanium treatment solution; c) contacting a pre-formed chrominated silica-support comprising from about 0.1 wt. % to about 20 wt. % water with the titanium treatment solution to form a pre-catalyst; and d) thermally treating the pre-catalyst to form the catalyst.

20 Claims, No Drawings

METHODS OF PREPARING A CATALYST

CROSS-REFERENCE TO RELATED APPLICATIONS

This application is a divisional of and claims priority to U.S. patent application Ser. No. 15/816,145 filed Nov. 17, 2017, published as U.S. Patent Application Publication No. 2019/0153133 A1 and entitled "Methods of Preparing a Catalyst," which is incorporated herein by reference in its entirety.

TECHNICAL FIELD

The present disclosure relates to catalyst compositions. More specifically, the present disclosure relates to methods of preparing olefin polymerization catalyst compositions and polymers prepared from same.

BACKGROUND

An economically important class of olefin polymerization catalysts includes chromium-silica-titania catalysts. The titanium-containing compounds used in the production of these catalysts are water-sensitive compounds and small amounts of water present during production of the catalyst can result in the ineffective deposition of titania onto the catalyst. An ongoing need exists for improved methods of preparing chromium-silica-titania catalysts.

SUMMARY

Disclosed herein is a method of preparing a catalyst comprising: a) contacting a non-aqueous solvent, a carboxylic acid, and a chromium-containing compound to form an acidic mixture wherein a volumetric ratio of non-aqueous solvent to carboxylic acid is from about 1:1 to about 100:1; b) forming a titanium treatment solution by contacting a titanium-containing compound with the acidic mixture of step a) to form the titanium treatment solution; c) contacting a pre-formed silica-support comprising from about 0.1 wt. % to about 20 wt. % water with the titanium treatment solution to form a pre-catalyst; and d) thermally treating the pre-catalyst by heating to a temperature of from about 400° C. to about 1000° C. for a time period of from about 1 minute to about 24 hours to form the catalyst.

Also disclosed herein is a method of preparing a catalyst comprising: a) contacting a non-aqueous solvent and a carboxylic acid to form an acidic mixture wherein a volume ratio of non-aqueous solvent to carboxylic acid is from about 1:1 to about 100:1; b) forming a titanium treatment solution by contacting a titanium-containing compound with the acidic mixture of step a); c) contacting a pre-formed chrominated silica-support comprising from about 0.1 wt. % to about 20 wt. % water with the titanium treatment solution to form a pre-catalyst; and d) thermally treating the pre-catalyst by heating to a temperature of from about 400° C. to about 1000° C. for a time period of from about 1 minute to about 24 hours to form the catalyst.

Also disclosed herein is a method of preparing a catalyst comprising: a) contacting a non-aqueous solvent and a carboxylic acid to form an acidic mixture wherein a volume ratio of non-aqueous solvent to carboxylic acid is from about 1:1 to about 100:1; b) forming a titanium treatment solution by contacting a titanium-containing compound with the acidic mixture of step a; c) contacting a pre-formed silica-support comprising from about 0.1 wt. % to about 20 wt. % water with the titanium treatment solution to form a titanated support; d) contacting the titanated support with a chromium-containing compound to form a pre-catalyst; and e) thermally treating the pre-catalyst to form the catalyst.

Also disclosed herein is a method of preparing a catalyst comprising: a) contacting a non-aqueous solvent and a carboxylic acid to form an acidic mixture wherein a volume ratio of non-aqueous solvent to carboxylic acid is from about 1:1 to about 100:1; b) forming a titanium treatment solution by contacting a titanium-containing compound with the acidic mixture of step a); c) contacting a pre-formed silica-support comprising from about 0.1 wt. % to about 20 wt. % water with a chromium-containing compound to form a chrominated support; d) contacting the chrominated support with the titanium treatment solution to form a pre-catalyst; and e) thermally treating the pre-catalyst to form the catalyst.

Also disclosed herein is a method of preparing a catalyst comprising: a) contacting an alcohol solvent and acetic acid form an acidic mixture wherein a volume ratio of the alcohol solvent to acetic acid is from about 2:1 to about 25:1; b) forming a titanium treatment solution by contacting titanium tetraisopropoxide with the acidic mixture of step a); c) contacting a pre-formed chrominated silica-support with the titanation treatment solution to form a pre-catalyst wherein water evolution occurs when the pre-formed chrominated silica-support is heated within a range of from about 180° C. to about 200° C. under vacuum conditions for a period of time ranging from about 8 hours to about 20 hours; and b) thermally treating the pre-catalyst by heating to a temperature of from about 400° C. to about 1000° C. for a time period of from about 1 minute to about 24 hours to form the catalyst.

DETAILED DESCRIPTION

This disclosure encompasses: (i) compositions of chromium-silica-titania catalysts hereinafter referred to as olefin polymerization catalysts; (ii) methods of preparing olefin polymerization catalysts; and (iii) methods of using olefin polymerization catalysts. This disclosure further encompasses the preparation of olefin polymerization catalysts by contacting a pre-formed silica-support with a treatment solution comprising a carboxylic acid, a non-aqueous solvent and at least one metal-containing compound.

In an aspect, a method of preparing an olefin polymerization catalyst of the present disclosure comprises contacting a treatment solution with a pre-formed silica-support under conditions suitable for formation of the olefin polymerization catalyst. In another aspect, a method of preparing an olefin polymerization catalyst of the present disclosure comprises contacting a treatment solution with a pre-formed chrominated silica-support under conditions suitable for the formation of the olefin polymerization catalyst. Treatment solutions suitable for use in the present disclosure comprise i) a carboxylic acid, (ii) a non-aqueous solvent and (iii) a transition metal-containing compound. In an aspect, the transition metal-containing compound comprises a titanium-containing compound; or alternatively a titanium-containing compound and a chromium-containing compound.

In an aspect, the treatment solution is a titanium treatment solution (TTS) comprising a carboxylic acid, a non-aqueous solvent, and a titanium-containing compound. Alternatively, the treatment solution is a titanium-chromium treatment solution (TCTS) comprising a carboxylic acid, a non-aqueous solvent, a titanium-containing compound and a chromium-containing compound.

In an aspect, a carboxylic acid suitable for use in the treatment solutions disclosed herein comprises a $C_1$ to $C_{15}$ carboxylic acid; alternatively, a $C_1$ to $C_{10}$ carboxylic acid; or alternatively, a $C_1$ to $C_5$ carboxylic acid. In an aspect, the carboxylic acid comprises formic acid, acetic acid, propionic acid, or a combination thereof.

In an aspect, non-aqueous solvents suitable for use in the treatment solutions disclosed herein include without limitation alcohols, ketones, aliphatic hydrocarbons, aromatic hydrocarbons, halocarbons, ethers, acetonitrile, esters, or combinations thereof.

In an aspect, the solvent comprises an ester, a ketone, an alcohol, or combinations thereof. In an aspect, the non-aqueous solvent comprises a $C_1$ to $C_{20}$ ester, a $C_1$ to $C_{10}$ ester or alternatively a $C_1$ to $C_5$ ester. In another aspect, the non-aqueous solvent comprises a $C_1$ to $C_{20}$ ketone, a $C_1$ to $C_{10}$ ketone or alternatively a $C_1$ to $C_5$ ketone. In another aspect, the non-aqueous solvent comprises a $C_1$ to $C_{20}$ alcohol, a $C_1$ to $C_{10}$ alcohol or alternatively a $C_1$ to $C_5$ alcohol.

Non-limiting examples of esters which can be utilized as a non-aqueous solvent include ethyl acetate, propyl acetate, butyl acetate, isobutyl isobutyrate, methyl lactate, ethyl lactate and combinations thereof. Non-limiting examples of ketones which can be utilized as a non-aqueous solvent include acetone, ethyl methyl ketone, methyl isobutyl ketone and combinations thereof. Non-limiting examples of alcohols which can be utilized as a non-aqueous solvent include methanol, ethanol, n-propanol, isopropanol, n-butanol, isobutanol, pentanol, hexanol, heptanol, octanol, benzyl alcohol, phenol, cyclohexanol or combinations thereof. In an aspect, the non-aqueous solvent suitable for use in the present disclosure comprises methanol, ethanol, isopropanol, n-propanol, butanol, acetone, methylethylketone, ethyl acetate, heptane or combinations thereof.

In an aspect, the solvent comprises an aliphatic hydrocarbon, an aromatic hydrocarbon, a halogenated aliphatic hydrocarbon, a halogenated aromatic hydrocarbon, or combinations thereof.

In an aspect, the non-aqueous solvent comprises a $C_3$ to $C_{20}$ aliphatic hydrocarbon; alternatively, a $C_4$ to $C_{15}$ aliphatic hydrocarbon; or alternatively, a $C_5$ to $C_{10}$ aliphatic hydrocarbon. Aliphatic hydrocarbons which can be utilized as the non-aqueous solvent can be cyclic or acyclic and/or can be linear or branched, unless otherwise specified. Non-limiting examples of suitable acyclic aliphatic hydrocarbon non-aqueous solvents that can be utilized singly or in any combination include propane, iso-butane, n-butane, butane (n-butane or a mixture of linear and branched $C_4$ acyclic aliphatic hydrocarbons), pentane (n-pentane or a mixture of linear and branched $C_5$ acyclic aliphatic hydrocarbons), hexane (n-hexane or mixture of linear and branched $C_6$ acyclic aliphatic hydrocarbons), heptane (n-heptane or mixture of linear and branched $C_7$ acyclic aliphatic hydrocarbons), octane (n-octane or a mixture of linear and branched $C_8$ acyclic aliphatic hydrocarbons), and combinations thereof.

In an aspect, the non-aqueous solvent comprises an aromatic hydrocarbon. Aromatic hydrocarbons which can be useful as a non-aqueous solvent in the treatment solution include a $C_6$ to $C_{20}$ aromatic hydrocarbon or alternatively, a $C_6$ to $C_{10}$ aromatic hydrocarbon. Non-limiting examples of suitable aromatic hydrocarbons that can be utilized singly or in any combination in the present disclosure include benzene, toluene, xylene (including ortho-xylene, meta-xylene, para-xylene, or mixtures thereof), ethylbenzene, or combinations thereof.

In an aspect, the non-aqueous solvent comprises a halogenated aliphatic hydrocarbon. Halogenated aliphatic hydrocarbons which can be useful as a non-aqueous solvent include $C_1$ to $C_{15}$ halogenated aliphatic hydrocarbons; alternatively, $C_1$ to $C_{10}$ halogenated aliphatic hydrocarbons; or alternatively, $C_1$ to $C_5$ halogenated aliphatic hydrocarbons. The halogenated aliphatic hydrocarbons can be cyclic, acyclic, linear or branched unless otherwise specified. Non-limiting examples of suitable halogenated aliphatic hydrocarbons which can be utilized include methylene chloride, chloroform, carbon tetrachloride, dichloroethane, trichloroethane, and combinations thereof; alternatively, methylene chloride, chloroform, dichloroethane, trichloroethane and combinations thereof.

In an aspect, the non-aqueous solvent comprises a halogenated aromatic hydrocarbon. Halogenated aromatic hydrocarbons which can be useful as a non-aqueous solvent include without limitation $C_6$ to $C_{20}$ halogenated aromatic hydrocarbons; or alternatively, $C_6$ to $C_{10}$ halogenated aromatic hydrocarbons. Non-limiting examples of suitable halogenated aromatic hydrocarbons include chlorobenzene, dichlorobenzene, and combinations thereof.

In an aspect of the present disclosure, the treatment solution comprises a titanium-containing compound. Any titanium-containing compound suitable for the preparation of an olefin polymerization catalyst of the type described herein may be used. In a further aspect, any titanium-containing compound capable of providing effective titanation to the olefin polymerization catalyst when utilizing the treatment solution as disclosed herein may be used. In a further aspect, the titanium-containing compound comprises a tetravalent titanium ($Ti^{4+}$)-containing compound or a trivalent titanium ($Ti^{3+}$)-containing compound. The $Ti^{4+}$-containing compound may be any compound that comprises tetravalent titanium, alternatively the $Ti^{4+}$-containing compound may be any compound that is able to release a $Ti^{4+}$ species upon dissolving into solution. The $Ti^{3+}$-containing compound may be any compound that comprises trivalent titanium, alternatively the $Ti^{3+}$-containing compound may be any compound that is able to release a $Ti^{3+}$ species upon dissolving into solution.

In an aspect, the titanium-containing compound is an organotitanium containing at least one alkoxide group, or alternatively, at least two alkoxide groups. Alternatively, the titanium-containing compound comprises a titanium tetraalkoxide. In an aspect, the titanium alkoxide is titanium ethoxide $Ti(OEt)_4$, titanium isopropoxide $Ti(OiPr)_4$, titanium n-propoxide $Ti(nOPr)_4$, titanium butoxide $Ti(OBu)_4$, titanium 2-ethylhexoxide, or combinations thereof. In a further aspect, the titanium-containing compound comprises a titanium (IV) halide, a titanium (III) halide, or a combination thereof. In an aspect, the titanium halide is titanium chloride $TiCl_4$, titanium bromide $TiBr_4$, or a combination thereof. In a still further aspect, the titanium-containing compound may be characterized by the general formula $Ti(OR^1)_2(acac)_2$ wherein $R^1$ can be ethyl, isopropyl, n-propyl, butyl, or a combination thereof and "acac" is acetylacetonate. Alternatively, the titanium-containing compound may be characterized by the general formula $Ti(OR^1)_2(oxal)$ wherein $R^1$ can be ethyl, isopropyl, n-propyl, butyl, or a combination thereof and "oxal" is oxalate.

The amount of the titanium-containing compound comprising the treatment solution may be any amount capable of providing effective titanation to the olefin polymerization catalyst prepared as described herein. In an aspect, the amount of titanium-containing compound (e.g., $Ti(OiPr)_4$), comprising the treatment solution is based upon the weight of silica-support used to prepare the olefin polymerization catalyst. In an aspect, the amount of titanium-containing compound may be a quantity sufficient to prepare an olefin polymerization catalyst comprising from about 0.01 wt. % to about 10 wt. %; alternatively, from about 0.5 wt. % to about 5 wt. %; alternatively, from about 1 wt. % to about 5 wt. %; or alternatively, from about 2 wt. % to about 4 wt. %. titanium by weight of the olefin polymerization catalyst. Herein, the percentage of titanium refers to the final weight percent of titanium associated with the olefin polymerization catalyst by total weight of the olefin polymerization catalyst after all processing steps (e.g., after activation via calcination). In an aspect, the titanium may be introduced via a treatment solution where the titanium-containing compound is present in amounts at least equal to the ranges disclosed for the amount of titanium present in the olefin polymerization catalyst.

In some aspects of the present disclosure, the treatment solution comprises a chromium-containing compound. Any chromium-containing compound suitable for the preparation of an olefin polymerization catalyst of the type described herein may be used. In a further aspect, any chromium-containing compound capable of providing a sufficient amount of chromium to the olefin polymerization catalyst when utilizing the treatment solution as disclosed herein may be used.

For example, the chromium-containing compound may be a water-soluble compound or a hydrocarbon-soluble compound. Examples of water-soluble chromium compounds suitable for use in the present disclosure include chromium trioxide, chromium acetate, chromium nitrate, or combinations thereof. Examples of hydrocarbon-soluble chromium compounds suitable for use in the present disclosure include tertiary butyl chromate, a diarene chromium (0) compound, biscyclopentadienyl chromium (II), chromium (III) acetylacetonate, or combinations thereof. In one aspect of the present disclosure, the chromium-containing compound may be a chromium (II) compound, a chromium (III) compound, or combinations thereof. Suitable chromium (III) compounds include, but are not limited to, chromium carboxylates, chromium naphthenates, chromium halides, chromium sulfate, chromium nitrate, chromium dionates, or combinations thereof. Specific chromium (III) compounds include, but are not limited to, chromium (III) sulfate, chromium (III) chloride, chromium (III) nitrate, chromic bromide, chromium (III) acetylacetonate, and chromium (III) acetate. Suitable chromium (II) compounds include, but are not limited to, chromous chloride, chromous bromide, chromous iodide, chromium (II) sulfate, chromium (II) acetate, or combinations thereof.

The amount of the chromium-containing compound comprising the treatment solution may be any amount capable of providing a sufficient amount of chromium to the olefin polymerization catalyst prepared as described herein. In a further aspect, the amount of chromium-containing compound (e.g., $Cr(OAc)_3$), comprising the treatment solution is based upon the weight of silica-support used to prepare the olefin polymerization catalyst. In an aspect, the amount of chromium-containing compound may be a quantity sufficient to prepare an olefin polymerization catalyst comprising chromium in the range from about 0.01 wt. % to about 10 wt. %; alternatively, from about 0.5 wt. % to about 5 wt. %; alternatively, from about 1 wt. % to about 5 wt. %; or alternatively, from about 2 wt. % to about 4 wt. % by weight of the olefin polymerization catalyst. Herein, the percentage chromium refers to the final weight percent chromium associated with the olefin polymerization catalyst by total weight of the olefin polymerization catalyst after all processing steps (e.g., after activation via calcination). In an aspect, the chromium may be introduced via a treatment solution where the chromium-containing compound is present in amounts at least equal to the ranges disclosed for the amount of chromium present in the olefin polymerization catalyst.

A treatment solution of the present disclosure comprises a carboxylic acid, a non-aqueous solvent and a titanium-containing compound. In an aspect, the treatment solution may be prepared using any suitable methodology. For example, a titanium treatment solution (TTS) may be prepared by adding the carboxylic acid to the non-aqueous solvent to form an acidic mixture followed by addition of the titanium-containing compound. In an aspect, the titanium-containing compound is not added to the non-aqueous solvent prior to addition of the carboxylic acid. In a further aspect, the treatment solution further comprises a chromium-containing compound and is designated a titanium-chromium treatment solution (TCTS). The TCTS may also be prepared using any suitable methodology. For the example, the TCTS may be prepared by adding the carboxylic acid to the non-aqueous solvent to form an acidic mixture. The chromium-containing compound may then be added to the acidic mixture before addition of the titanium-containing compound; alternatively, the chromium-containing compound may be added after addition of the titanium-containing compound to provide the TCTS. In an aspect, the titanium-containing compound is not added to the non-aqueous solvent prior to addition of the carboxylic acid.

It is further contemplated that the benefits of utilizing a TTS or a TCTS to prepare the olefin polymerization catalyst as disclosed herein may be realized through the application of any method that contacts the carboxylic acid with a mixture of catalyst components prior to addition of the titanium-containing compound. In a non-limiting example, the chromium-containing compound may be added to the non-aqueous solvent to form a solution followed by subsequent, step-wise addition of the carboxylic acid, the preformed silica-support and, finally, the titanium-containing compound.

In an aspect, the titanium treatment solution (TTS) comprises a volumetric ratio of non-aqueous solvent to carboxylic acid (e.g., AcOH), in a range of from about 1:1 to about 100:1; or alternatively, from about 2:1 to about 25:1. In an aspect, the amount of titanium-containing compound contained within the TTS comprises an equivalent amount of titanium to provide in the range of from about 1 wt. % to about 5 wt. % of titanium based upon the weight of the chrominated silica-support. In a non-limiting example wherein 1.0 kg of chrominated silica-support is used to prepare the olefin polymerization catalyst described herein and the titanium-containing compound is $Ti(OiPr)_4$), the TTS comprises in the range of from about 60 g to about 300 g of $Ti(OiPr)_4$. In still another particular aspect, a molar ratio of carboxylic acid to titanium of the TTS prepared as described herein may range from about 1:1 to about 200:1; or alternatively, from about 2:1 to about 150:1.

In an aspect, the titanium-chromium treatment solution (TCTS) comprises a solvent system comprising two or more non-aqueous solvents. The term "solvent system" as used herein refers only to the two or more non-aqueous solvents and excludes any other component of the TCTS, (e.g., carboxylic acid). In an aspect, the solvent system of the TCTS comprises a first alcohol and a second alcohol wherein the volumetric ratio of the first alcohol to the second alcohol is in the range of from about 9:1 to about 1:9, or alternatively from about 7:3 to about 3:7. The TCTS further comprises a volumetric ratio of solvent system to carboxylic acid (e.g., AcOH), in a range of from about 1:1 to about 100:1; or alternatively, from about 2:1 to about 25:1. In an aspect, the amount of chromium-containing compound (e.g., $Cr(OAc)_3$), contained within the TCTS comprises an equivalent amount of chromium to provide in the range of from about 0.5 wt. % to about 2 wt. % chromium based upon the weight of the silica-support. In a non-limiting example wherein 1.0 kg of silica-support is used to prepare the olefin polymerization catalyst described herein and the chromium-containing compound is $Cr(OAc)_3$, the TCTS comprises in the range of from about 22 g to about 88 g of $Cr(OAc)_3$. In an aspect, the amount of titanium-containing compound contained within the TTS comprises an equivalent amount of titanium to provide in the range of from about 1 wt. % to about 5 wt. % of titanium based upon the weight of the chrominated silica-support. In a non-limiting example wherein 1.0 kg of silica-support is used to prepare the olefin polymerization catalyst described herein and the titanium-containing compound is $Ti(OiPr)_4$, the TTS comprises in the range of from about 60 g to about 300 g of $Ti(OiPr)_4$). In still another particular aspect, a molar ratio of carboxylic acid to titanium of the TCTS prepared as described herein may range from about 1:1 to about 200:1; or alternatively, from about 2:1 to about 150:1.

In an aspect, a treatment solution of the type disclosed herein (e.g., TTS or TCTS) is contacted with a silica-support. The silica-support may comprise a pre-formed silica-support or alternatively a pre-formed chrominated silica-support. In an aspect, preparation of an olefin polymerization catalyst of the type disclosed herein excludes drying of the pre-formed silica-support or the pre-formed chrominated silica-support prior to contact with any other catalyst component (e.g., titanium-containing compound). Consequently, the pre-formed silica-support and/or the pre-formed chrominated silica-support suitable for use in the present disclosure may be a termed a hydrated silica-support. Without wishing to be limited by theory, a hydrated silica-support comprises a silica-support wherein water evolution occurs when the silica-support is heated within a range of from about 180° C. to about 200° C. under vacuum conditions for a period of time ranging from about 8 hours to about 20 hours. In a further aspect, the pre-formed silica-support and/or the pre-formed chrominated silica-support may contain from about 0.1 wt. % to about 20 wt. % water; or alternatively from about 0.1 wt. % to about 10 wt. % water based upon the total weight of the pre-formed silica-support and/or the pre-formed chrominated silica-support.

A pre-formed silica-support and/or a pre-formed chrominated silica-support suitable for use in the present disclosure may have a surface area and pore volume effective to provide for the production of an active olefin polymerization catalyst. In an aspect of the present disclosure, the pre-formed silica-support and/or the pre-formed chrominated silica-support possesses a surface area in the range of from about 100 $m^2$/gram to about 1000 $m^2$/gram, alternatively from about 250 $m^2$/gram to about 1000 $m^2$/gram, alternatively from about 250 $m^2$/gram to about 700 $m^2$/gram, alternatively from about 250 $m^2$/gram to about 600 $m^2$/gram, or alternatively greater than about 250 $m^2$/gram. The pre-formed silica-support and/or the pre-formed chrominated silica-support may be further characterized by a pore volume of greater than about 0.9 $cm^3$/gram, alternatively greater than about 1.0 $cm^3$/gram, or alternatively greater than about 1.5 $cm^3$/gram. In an aspect of the present disclosure, the pre-formed silica-support and/or the pre-formed chrominated silica-support is characterized by a pore volume ranging from about 1.0 $cm^3$/gram to about 2.5 $cm^3$/gram. The pre-formed silica-support and/or the pre-formed chrominated silica-support may be further characterized by an average particle size of from about 10 microns to about 500 microns, alternatively about 25 microns to about 300 microns, or alternatively about 40 microns to about 150 microns. Generally, the average pore size of the pre-formed silica-support and/or the pre-formed chrominated silica-support ranges from about 10 Angstroms to about 1000 Angstroms. In one aspect of the present disclosure, the average pore size of the pre-formed silica-support and/or the pre-formed chrominated silica-support is in the range of from about 50 Angstroms to about 500 Angstroms, while in yet another aspect of the present disclosure the average pore size ranges from about 75 Angstroms to about 350 Angstroms.

The pre-formed silica-support and/or the pre-formed chrominated silica-support may contain greater than about 50 wt. % silica; alternatively, greater than about 80 wt. % silica; alternatively, greater than about 95 wt. % silica based upon the weight of the pre-formed silica-support. The pre-formed silica-support and/or the pre-formed chrominated silica-support may be prepared using any suitable method. For example, the pre-formed silica-support and/or the pre-formed chrominated silica-support may be prepared synthetically by hydrolyzing tetrachlorosilane ($SiCl_4$) with water or by contacting sodium silicate with a mineral acid. The pre-formed silica-support and/or the pre-formed chrominated silica-support may include additional components that do not adversely affect the catalyst, such as zirconia, alumina, thoria, magnesia, fluoride, sulfate, phosphate, or mixtures thereof. Non-limiting examples of pre-formed silica-support suitable for use in this disclosure includes ES70 which is a pre-formed silica-support material with a surface area of 300 $m^2$/gram, and a pore volume of 1.6 $cm^3$/gram that is commercially available from PQ Corporation, HA30W which is a pre-formed chrominated silica-support material that is commercially available from W. R. Grace and Company, and V398400 which is a pre-formed silica-support material that is commercially available from Evonik.

The pre-formed silica-support and/or the pre-formed chrominated silica-support may be present in the olefin polymerization catalyst in an amount of from about 50 wt. % to about 99 wt. %; or alternatively, from about 80 wt. % to about 99 wt. %. Herein the percentage of pre-formed silica-support and/or the pre-formed chrominated silica-support refers to the final weight percent of pre-formed silica-support and/or the pre-formed chrominated silica-support associated with the olefin polymerization catalyst by total weight of the olefin polymerization catalyst after all processing steps (e.g., after activation via calcination).

Disclosed herein are methods of preparing an olefin polymerization catalyst composition. In an aspect, a method of preparing an olefin polymerization catalyst composition comprises contacting one or more catalyst components. Various sequences for contacting of the catalyst components are also disclosed herein, e.g., forming a titanium treatment solution (TTS) followed by contacting a pre-formed silica-support with the TTS. It is contemplated that other sequences for the contacting of the catalyst components may also produce an olefin polymerization catalyst of the type disclosed herein. Consequently, in an aspect of the present disclosure, the catalyst components may be contacted in any order or fashion deemed suitable to one of ordinary skill in the art with the aid of the present disclosure to produce a catalyst of the type disclosed herein.

In an aspect of the present disclosure, a method for preparation of an olefin polymerization catalyst comprises contacting a non-aqueous solvent, a carboxylic acid, and a chromium-containing compound, each of the type disclosed herein, to form an acidic mixture. The components of the acidic mixture may be subsequently contacted with a titanium-containing compound (e.g., Ti(OiPr)$_4$) to form a TCTS. The method for preparation of the olefin polymerization catalyst may further comprise contacting the TCTS with a pre-formed silica-support to form a pre-catalyst (e.g., a chrominated, titanated support). In yet a further aspect, preparation of an olefin polymerization catalyst excludes drying of the pre-formed silica-support prior to contact of the pre-formed silica-support with any other catalyst component.

In an aspect of the present disclosure, a method for preparation of an olefin polymerization catalyst comprises contacting a non-aqueous solvent and a carboxylic acid, both of the type disclosed herein, to form an acidic mixture. The acidic mixture may then be contacted with a titanium-containing compound (e.g., Ti(OiPr)$_4$) to form a titanium treatment solution (TTS). The method for preparation of the olefin polymerization catalyst may further comprise contacting the TTS with a pre-formed chrominated silica-support to generate a pre-catalyst (e.g., a chrominated, titanated support). In yet a further aspect, preparation of the olefin polymerization catalyst excludes drying of the pre-formed chrominated silica-support prior to contact of the pre-formed chrominated silica-support with any other catalyst component.

In an aspect of the present disclosure, a method for preparation of an olefin polymerization catalyst comprises contacting a non-aqueous solvent and a carboxylic acid, both of the type disclosed herein, to form an acidic mixture. The components of the acidic mixture may then be contacted with a titanium-containing compound (e.g., Ti(OiPr)$_4$) to form a TTS. The TTS may then be contacted with a pre-formed silica-support to form a titanated support. The method may further comprise contacting the titanated support with a chromium-containing compound to form a pre-catalyst (e.g., a chrominated, titanated support).

A method for preparation of an olefin polymerization catalyst may comprise contacting a non-aqueous solvent with a pre-formed silica-support and a chromium-containing compound, each of the type disclosed herein, to form a first mixture containing a chrominated support. In an aspect, an acidic mixture is prepared by contacting a carboxylic acid and a non-aqueous solvent, both of the type disclosed herein. The acidic mixture may then be contacted with a titanium-containing compound (e.g., Ti(OiPr)$_4$) to form a TTS. In an aspect, the method further comprises contacting the TTS with the first mixture containing the chrominated support to form a pre-catalyst (e.g., a chrominated, titanated support). In yet a further aspect, preparation of an olefin polymerization catalyst of the type disclosed herein excludes drying of the pre-formed silica-support prior to contact of the pre-formed silica-support with any other catalyst component.

In an aspect of the present disclosure, the method further comprises thermally treating the pre-catalyst (e.g., a chrominated, titanated support) to remove the non-aqueous solvent, the carboxylic acid and any other volatile compounds associated with the pre-catalyst. The method of preparing the olefin polymerization catalyst as described herein may be applied to a pre-catalyst prepared by any of the methods described herein. For example, the pre-catalyst may be dried at temperatures ranging from about 25° C. to about 300° C., alternatively from about 50° C. to about 200° C., or alternatively from about 80° C. to about 150° C. to form a dried pre-catalyst. In an aspect of the present disclosure, the dried pre-catalyst is then activated via a calcination step by heating in an oxidizing environment to produce the olefin polymerization catalyst. For example, the dried pre-catalyst may be calcined in the presence of air at a temperature in the range of from about 400° C. to about 1,000° C., alternatively from about 500° C. to about 900° C., or alternatively from about 500° C. to about 850° C. and for a time period of from about 1 min to about 24 hours, alternatively from about 1 minute to about 10 hours, alternatively from about 1 hour to about 24 hours, alternatively from about 1 hour to about 12 hours, alternatively from about 3 hours to about 12 hours, alternatively from about 20 min to about 5 hours, or alternatively from about 1 hour to about 3 hours to produce the olefin polymerization catalyst. The method of preparing the olefin polymerization catalyst as described herein may be applied to a pre-catalyst prepared by any of the methods described herein.

Without wishing to be being limited by theory, it will be appreciated by one of ordinary skill in the art that a treatment solution of the type disclosed herein (e.g., TTS or TCTS), may immobilize adventitious water. Adventitious water present in the TTS or TCTS is water associated with the components of the olefin polymerization catalyst prior to the contacting of the components, i.e., water that is associated with the carboxylic acid, the non-aqueous solvent, the titanium-containing compound, the chromium-containing compound, the silica-support and combinations thereof. In an aspect, the TTS or TCTS may immobilize adventitious water through non-covalent binding interactions between molecules of the carboxylic acid and molecules of water. It will be appreciated by one of ordinary skill in the art that the titanium-containing compounds used herein are water-sensitive compounds that can be rendered ineffective for the deposition of active titanium onto a pre-formed silica-support in the presence of adventitious water. Without wishing to be limited by theory, utilization of a treatment solution of the type disclosed herein (e.g., TTS or TCTS) in the preparation of an olefin polymerization catalyst may reduce the amount of free water the titanium is exposed to the extent that effective titanation of the support material occurs in the presence of other hydrated catalyst components. In a further aspect, a catalyst preparation methodology utilizing a treatment solution as described herein may reduce or eliminate the need for drying of hydrated catalyst components (e.g., pre-formed silica-support) prior to use in the preparation of the olefin polymerization catalysts thereby reducing the time and costs associated with preparation of catalysts of the type disclosed herein.

The olefin polymerization catalysts of the present disclosure are suitable for use in any olefin polymerization method, using various types of polymerization reactors. In an aspect of the present disclosure, a polymer of the present disclosure is produced by any olefin polymerization method, using various types of polymerization reactors. As used herein, "polymerization reactor" includes any reactor capable of polymerizing olefin monomers to produce homopolymers and/or copolymers. Homopolymers and/or copolymers produced in the reactor may be referred to as resin and/or polymers. The various types of reactors include, but are not limited to those that may be referred to as batch, slurry, gas-phase, solution, high pressure, tubular, autoclave, or other reactor and/or reactors. Gas phase reactors may comprise fluidized bed reactors or staged horizontal reactors. Slurry reactors may comprise vertical and/or horizontal loops. High pressure reactors may comprise autoclave and/or tubular reactors. Reactor types may include batch and/or continuous processes. Continuous processes may use intermittent and/or continuous product discharge or transfer. Processes may also include partial or full direct recycle of un-reacted monomer, un-reacted comonomer, catalyst and/or co-catalysts, diluents, and/or other materials of the polymerization process.

Polymerization reactor systems of the present disclosure may comprise one type of reactor in a system or multiple reactors of the same or different type, operated in any suitable configuration. Production of polymers in multiple reactors may include several stages in at least two separate polymerization reactors interconnected by a transfer system making it possible to transfer the polymers resulting from the first polymerization reactor into the second reactor. Alternatively, polymerization in multiple reactors may include the transfer, either manual or automatic, of polymer from one reactor to subsequent reactor or reactors for additional polymerization. Alternatively, multi-stage or multi-step polymerization may take place in a single reactor, wherein the conditions are changed such that a different polymerization reaction takes place.

The desired polymerization conditions in one of the reactors may be the same as or different from the operating conditions of any other reactors involved in the overall process of producing the polymer of the present disclosure. Multiple reactor systems may include any combination including, but not limited to multiple loop reactors, multiple gas phase reactors, a combination of loop and gas phase reactors, multiple high pressure reactors or a combination of high pressure with loop and/or gas reactors. The multiple reactors may be operated in series or in parallel. In an aspect of the present disclosure, any arrangement and/or any combination of reactors may be employed to produce the polymer of the present disclosure.

According to one aspect of the present disclosure, the polymerization reactor system may comprise at least one loop slurry reactor. Such reactors are commonplace, and may comprise vertical or horizontal loops. Monomer, diluent, catalyst system, and optionally any comonomer may be continuously fed to a loop slurry reactor, where polymerization occurs. Generally, continuous processes may comprise the continuous introduction of a monomer, a catalyst, and/or a diluent into a polymerization reactor and the continuous removal from this reactor of a suspension comprising polymer particles and the diluent. Reactor effluent may be flashed to remove the liquids that comprise the diluent from the solid polymer, monomer and/or comonomer. Various technologies may be used for this separation step including but not limited to, flashing that may include any combination of heat addition and pressure reduction; separation by cyclonic action in either a cyclone or hydrocyclone; separation by centrifugation; or other appropriate method of separation.

Slurry polymerization processes (also known as particle-form processes) are disclosed in U.S. Pat. Nos. 3,248,179, 4,501,885, 5,565,175, 5,575,979, 6,239,235, 6,262,191 and 6,833,415, for example; each of which are herein incorporated by reference in their entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of the present disclosure, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 4,588,790, 5,352,749, and 5,436,304, each of which is incorporated by reference in its entirety herein.

According to still another aspect of the present disclosure, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the present disclosure, the polymerization reactor may comprise a solution polymerization reactor wherein the monomer is contacted with the catalyst composition by suitable stirring or other means. A carrier comprising an organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide polymer properties include, but are not limited to temperature, pressure, type and quantity of catalyst or co-catalyst, and the concentrations of various reactants. Polymerization temperature can affect catalyst productivity, polymer molecular weight and molecular weight distribution. Suitable polymerization temperatures may be any temperature below the de-polymerization temperature, according to the Gibbs Free Energy Equation. Typically, this includes from about 60° C. to about 280° C., for example, and/or from about 70° C. to about 110° C., depending upon the type of polymerization reactor and/or polymerization process.

Suitable pressures will also vary according to the reactor and polymerization process. The pressure for liquid phase polymerization in a loop reactor is typically less than 1000 psig (6.9 MPa). Pressure for gas phase polymerization is usually at about 200 psig (1.4 MPa)-500 psig (3.45 MPa). High pressure polymerization in tubular or autoclave reactors is generally run at about 20,000 psig (138 MPa); to 75,000 psig (518 MPa). Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce polymers with certain physical and mechanical properties. The proposed end-use product that will be formed by the polymer and the method of forming that product may be varied to determine the desired final product properties. Mechanical properties include, but are not limited to tensile strength, flexural modulus, impact resistance, creep, stress relaxation and hardness tests. Physical properties include, but are not limited to density, molecular weight, molecular weight distribution, melting temperature, glass transition temperature, temperature melt of crystallization, density, stereoregularity, crack growth, short chain branching, long chain branching and rheological measurements.

The concentrations of monomer, comonomer, hydrogen, co-catalyst, modifiers, and electron donors are generally important in producing specific polymer properties. Comonomer may be used to control product density. Hydrogen may be used to control product molecular weight. Co-catalysts may be used to alkylate, scavenge poisons and/or control molecular weight. The concentration of poisons may be minimized, as poisons may impact the reactions and/or otherwise affect polymer product properties. Modifiers may be used to control product properties and electron donors may affect stereoregularity.

Polymers such as polyethylene homopolymers and copolymers of ethylene with other mono-olefins may be produced in the manner described above using the polymerization catalysts prepared as described herein. Polymers produced as disclosed herein may be formed into articles of manufacture or end use articles using techniques known in the art such as extrusion, blow molding, injection molding, fiber spinning, thermoforming, and casting. For example, a polymer resin may be extruded into a sheet, which is then thermoformed into an end use article such as a container, a cup, a tray, a pallet, a toy, or a component of another product. Examples of other end use articles into which the polymer resins may be formed include pipes, films, and bottles.

An olefin polymerization catalyst of the type described herein may be contacted with an olefin under conditions suitable for the preparation of a polyolefin. In an aspect, the olefin is ethylene and the polyolefin is polyethylene. Polyethylene prepared using olefin polymerization catalysts of this disclosure may be characterized by a melt index (MI), ranging from about 0 g/10 min. to about 5 g/10 min.; alternatively, from about 0.01 g/10 min. to about 2 g/10 min.; or alternatively, from about 0.05 g/10 min. to about 0.5 g/10 min. The MI refers to the amount of a polymer which can be forced through an extrusion rheometer orifice of 0.0825 inch diameter when subjected to a force of 2,160 grams in ten minutes at 190° C., as determined in accordance with ASTM D1238-82, condition E.

Further, the polyethylene prepared as described herein may be characterized by a high load melt index (HLMI), ranging from about 1 g/10 min. to about 1000 g/10 min.; alternatively, from about 3 g/10 min. to about 300 g/10 min.; alternatively, from about 8 g/10 min. to about 100 g/10 min; or alternatively, from about 12 g/10 min to about 50 g/10 min. The HLMI represents the rate of flow of a molten polymer through an orifice of 0.0825 inch diameter when subjected to a force of 21,600 grams at 190° C. as determined in accordance with ASTM D1238-82, condition F.

In an aspect of the present disclosure, the polyethylene prepared as described herein may be characterized by a shear response ranging from about 30 to about 1000; alternatively, from about 50 to about 250; or alternatively, less than about 250; alternatively less than about 200; or alternatively, less than about 170. The shear response refers to the ratio of high load melt index to melt index (HLMI/MI).

EXAMPLES

The following examples are given as particular aspect of the present disclosures of the present disclosure and to demonstrate the practice and advantages thereof. It is understood that the examples are given by way of illustration and are not intended to limit the specification or the claims to follow in any manner.

In the following experiments, nPrOH, MeOH, acetic acid (HOAc), and the chromium and titanium reagents were used as received and were not dried prior to use. Type A catalysts were prepared from a chrominated silica-support (HA30W, W. R. Grace and Company) which was used as received and was not dried prior to use. A titanium-containing compound, either $Ti(OiPr)_2(acac)_2$ (230 mg per g chrominated silica-support) or $Ti(OiPr)_4$ (180 mg per g chrominated silica-support) was dissolved in a mixture of nPrOH and HOAc to provide a TTS of the type disclosed herein. The amount of HOAc in the nPrOH/HOAc mixture ranged from 8% to 22% by volume based on the combined volume of nPrOH and HOAc. A pre-catalyst was prepared by impregnating the HW30A chrominated silica-support to incipient wetness with the TTS. The pre-catalyst was then dried and calcined in air for three hours at 650° C. prior to use in polymerization experiments.

Type B catalysts were prepared from a silica-support (V398400, Evonik) which was used as received and was not dried prior to use. A solvent system was prepared containing a mixture of 30% by volume MeOH in nPrOH. $Cr(OAc)_3$ (44 mg per g silica-support) was added to the solvent system, followed by addition of HOAc sufficient to give an acidic solvent containing 22% by volume HOAc based on the combined volume of the solvent system and HOAc. $Ti(OiPr)_4$ (180 mg per g silica-support) was dissolved in the acidic solvent to provide a TCTS of the type disclosed herein. A pre-catalyst was prepared by impregnating the V398400 silica-support to incipient wetness with the TCTS. The pre-catalyst was then dried and calcined in air for three hours at 650° C. prior to use in polymerization experiments.

Polymerization tests were conducted in a 2.2 liter stainless-steel reactor equipped with a marine stirrer rotating at 500 rpm. The reactor was surrounded by a steel jacket, through which a mixture of cold water and steam was passed to precisely control the temperature to within half a degree centigrade, with the aid of electronic control instruments.

Unless otherwise stated, a small amount (0.01 to 0.10 grams normally) of the solid catalyst prepared as described herein was first charged under nitrogen to the dry reactor. Next 1.2 liter of isobutane liquid was charged and the reactor and heated up to the 105° C. Finally, ethylene was added to the reactor to maintain a fixed pressure, 550 psig (3.8 MPa), during the experiment. The mixture was stirred continuously for the specified time, usually around one hour, and the activity was noted by recording the flow of ethylene into the reactor to maintain the set pressure.

After the allotted time, the ethylene flow was stopped and the reactor slowly depressurized and opened to recover a granular polymer powder. In all cases the reactor was clean with no indication of any wall scale, coating or other forms of fouling. The polymer powder was then removed and weighed. Activity was specified as grams of polymer produced per gram of solid catalyst charged per hour.

The results of polymerization runs are shown in Table 1. The table lists each silica-support, titanium-containing compound, and solvent system used to prepare the TTS or TCTS utilized in each run. The table also lists values for polymer properties including melt index, $I_{10}$ melt index, high load melt index and shear response. Melt index (MI, g/10 min) was determined in accordance with ASTM D1238-82, condition E at 190° C. with a 2,160 gram weight. $I_{10}$ (g/10 min) is the polymer flow rate using a 10 kg weight. The high load melt index (HLMI) of a polymer resin represents the rate of flow of a molten resin through an orifice of 0.0825 inch diameter when subjected to a force of 21,600 grams at 190° C. The HLMI values were determined in accordance with ASTM D1238-82 condition F.

Comparative run CM-1 is a Type A catalyst containing no titanium and comparative run CM-2 is a Type A catalyst which was titanated without using a TTS of the present disclosure. CM-1 and CM-2 provide baseline levels for productivity, activity, and melt index values. Comparative runs CM-3, CM-4 and CM-5 are Type B catalysts containing no titanium which provide baseline levels for productivity, activity, and melt index values. The melt index values MI, $I_{10}$, and HLMI indicate the extent of titanation upon the silica-support where higher melt index values indicate more effective (i.e., greater), titanation.

wise, runs IN-5 to IN-6 display higher melt index values relative to the comparative runs using a Type B catalyst. The results indicate that use of a TCTS or a TTS comprising an alcohol-acetic acid solvent system as described herein produces highly effective titanation on the silica surface of an olefin polymerization catalyst. The results also show that use of a TCTS or a TTS as described herein can produce highly effective titanation on a silica-support that has not been dried prior to use.

Notably, catalysts prepared as disclosed herein produce polymers having an increased shear response, even though all catalysts were calcined at 650° C. and tested under the same polymerization conditions. The results demonstrate that polymers produced using an olefin polymerization catalyst prepared with a TTS as disclosed herein have a lower HLMI/MI ratio (i.e., shear response) when compared to polymers produced using catalysts prepared in the absence of a TTS.

Additional Disclosure

The following enumerated aspects of the present disclosures are provided as non-limiting examples.

A first aspect which is a method of preparing a catalyst comprising: a) contacting a non-aqueous solvent, a carboxylic acid, and a chromium-containing compound to form an acidic mixture wherein a volumetric ratio of non-aqueous solvent to carboxylic acid is from about 1:1 to about 100:1; b) forming a titanium treatment solution by contacting a titanium-containing compound with the acidic mixture of step a) to form the titanium treatment solution; c) contacting a pre-formed silica-support comprising from about 0.1 wt. % to about 20 wt. % water with the titanium treatment solution to form a pre-catalyst; and d) thermally treating the pre-catalyst by heating to a temperature of from about 400° C. to about 1000° C. for a time period of from about 1 minute to about 24 hours to form the catalyst.

A second aspect which is the method of the first aspect wherein the carboxylic acid comprises a $C_1$ to $C_{15}$ carboxylic acid.

TABLE 1

| Run No. | Cat Type | Ti Source | Solvent | % Ti | Productivity g PE/g cat | Activity g PE/g-cat-h | HLMI (g/10 min) | $I_{10}$ (g/10 min) | MI (g/10 min.) | HLMI/MI |
|---|---|---|---|---|---|---|---|---|---|---|
| CM-1 | A | None | None | 0.0 | 2973 | 2973 | 5.45 | 0.87 | 0 | — |
| CM-2 | A | Ti(OiPr)$_4$ | None | 3.5 | 2230 | 2487 | 6.8 | 1.48 | 0.07 | 93 |
| IN-1 | A | Ti(OiPr)$_2$(acac)$_2$ | 10% CH$_3$CO$_2$H | 3.5 | 3140 | 2853 | 24.4 | 5.36 | 0.29 | 85 |
| IN-2 | A | Ti(OiPr)$_2$(acac)$_2$ | 16% CH$_3$CO$_2$H | 4.5 | 2902 | 2854 | 31.4 | 6.81 | 0.35 | 90 |
| IN-3 | A | Ti(OiPr)$_4$ | 8% CH$_3$CO$_2$H | 3.5 | 3215 | 3180 | 28.6 | 6.31 | 0.34 | 83 |
| IN-4 | A | Ti(OiPr)$_4$ | 22% CH$_3$CO$_2$H | 4.5 | 3178 | 3467 | 39.1 | 8.69 | 0.49 | 80 |
| CM-3 | B | None | None | 0 | 2617 | 3414 | 3.65 | 0.53 | 0 | — |
| CM-4 | B | None | None | 0 | 2704 | 3452 | 3.86 | 0.75 | 0 | — |
| CM-5 | B | None | None | 0 | 2356 | 2049 | 3.47 | 0.62 | 0 | — |
| IN-5 | B | Ti(OiPr)$_4$ | 22% CH$_3$CO$_2$H | 3.0 | 2664 | 2906 | 15.8 | 3.16 | 0.13 | 123 |
| IN-6 | B | Ti(OiPr)$_4$ | 22% CH$_3$CO$_2$H | 3.0 | 2924 | 2658 | 12.5 | 2.50 | 0.08 | 158 |
| CM-6 | C* | Cogel | None | 2.5 | 3117 | 2309 | 19.6 | 4.22 | 0.24 | 82 |

*Commerically available as Magnapore (W. R. Grace) Cr/Silica/Titania cogel. Pore volume = 2.5 mL/g, surface area of about 500 m$^2$/g.

The data presented in Table 1 indicate that runs carried out with catalysts prepared as described herein (indicated by the prefix IN) displayed higher melt index values when compared to catalysts not prepared with a treatment solution. For example, runs IN-1 to IN-4 display higher melt index values relative to comparative runs using a Type A catalyst. Like- A third aspect which is the method of the second aspect wherein a ratio of moles of carboxylic acid to moles of titanium of the titanium-containing compound is from about 1:1 to about 200:1.

A fourth aspect which is the method of any of the first through third aspects wherein water evolution occurs when the pre-formed silica-support is heated within a range of from about 180° C. to about 200° C. under vacuum conditions for a period of time ranging from about 8 hours to about 20 hours.

A fifth aspect which is the method of any of the first through fourth aspects wherein the titanium-containing compound comprises a titanium tetraalkoxide.

A sixth aspect which is the method of any of the first through fifth aspects wherein the non-aqueous solvent is an alcohol solvent, a hydrocarbon solvent, a ketone solvent, an ester solvent or combinations thereof.

A seventh aspect which is the method of any of the first through sixth aspects wherein the chromium-containing compound comprises chromium trioxide, chromium acetate, chromium nitrate, tertiary butyl chromate, a diarene chromium (0) compound, biscyclopentadienyl chromium(II), chromium (III) acetylacetonate, or combinations thereof.

An eighth aspect which is the method of any of the first through seventh aspects wherein the pre-formed silica-support is characterized by a surface area of from about 100 $m^2$/gram to about 1000 $m^2$/gram and a pore volume of from about 1.0 $cm^3$/gram to about 2.5 $cm^3$/gram.

A ninth aspect which is the method of any of the first through eighth aspects wherein an amount of chromium present in catalyst may range from about 0.01% to about 10% by weight of the catalyst and an amount of titanium present in the catalyst may range from about 0.01% to about 10% by weight of the catalyst.

A tenth aspect which is a method of forming a polymer comprising contacting the catalyst of any of the first through ninth aspects with a monomer under conditions suitable for formation of a polymer and recovering the polymer.

An eleventh aspect which is the method of tenth aspect wherein the monomer comprises an ethylene monomer and the polymer comprises an ethylene polymer.

A twelfth aspect which is the method of any of the tenth through eleventh aspects wherein the polymer has a high load melt index of from about 1 g/10 min to about 1 g/10 min, and a shear response of from about 30 to about 1000.

A thirteenth aspect which is the method of any of the tenth through twelfth aspects wherein the polymer has a high load melt index that is from about 3 to about 6 times greater than the high load melt index of a polymer produced by utilizing an otherwise similar catalyst produced in the absence of a titanium treatment solution.

A fourteenth aspect which is a method of preparing a catalyst comprising: a) contacting a non-aqueous solvent and a carboxylic acid to form an acidic mixture wherein a volume ratio of non-aqueous solvent to carboxylic acid is from about 1:1 to about 100:1; b) forming a titanium treatment solution by contacting a titanium-containing compound with the acidic mixture of step a); c) contacting a pre-formed chrominated silica-support comprising from about 0.1 wt. % to about 20 wt. % water with the titanium treatment solution to form a pre-catalyst; and d) thermally treating the pre-catalyst by heating to a temperature of from about 400° C. to about 1000° C. for a time period of from about 1 minute to about 24 hours to form the catalyst.

A fifteenth aspect which is the method of the fourteenth aspect wherein the carboxylic acid comprises a $C_1$ to $C_{15}$ carboxylic acid.

A sixteenth aspect which is the method of any of the fourteenth through fifteenth aspects wherein a ratio of moles of carboxylic acid to moles of titanium of the titanium-containing compound is from about 1:1 to about 200:1.

A seventeenth aspect which is the method of any of the fourteenth through sixteenth aspects wherein water evolution occurs when the pre-formed chrominated silica-support is heated within a range of from about 180° C. to about 200° C. under vacuum conditions for a period of time ranging from about 8 hours to about 20 hours.

An eighteenth aspect which is a method of forming a polymer comprising contacting the catalyst of any of the fourteenth through seventeenth aspects with a monomer under conditions suitable for formation of a polymer and recovering the polymer.

An nineteenth aspect which is the method of eighteenth aspect wherein the monomer comprises an ethylene monomer and the polymer comprises an ethylene polymer.

A twentieth aspect which is the method of any of the eighteenth through nineteenth aspects wherein the polymer has a high load melt index of from about 1 g/10 min to about 1 g/10 min, and a shear response of from about 30 to about 1000.

A twenty-first aspect which is the method of any of the eighteenth through twentieth aspects wherein the polymer has a high load melt index that is from about 3 to about 6 times greater than the high load melt index of a polymer produced by utilizing an otherwise similar catalyst produced in the absence of a titanium treatment solution.

A twenty-second aspect which is a method of preparing a catalyst comprising: a) contacting a non-aqueous solvent and a carboxylic acid to form an acidic mixture wherein a volume ratio of non-aqueous solvent to carboxylic acid is from about 1:1 to about 100:1; b) forming a titanium treatment solution by contacting a titanium-containing compound with the acidic mixture of step a; c) contacting a pre-formed silica-support comprising from about 0.1 wt. % to about 20 wt. % water with the titanium treatment solution to form a titanated support; d) contacting the titanated support with a chromium-containing compound to form a pre-catalyst; and e) thermally treating the pre-catalyst to form the catalyst.

An twenty-third aspect which is the method of the twenty-second aspect wherein the carboxylic acid comprises a $C_1$ to $C_{15}$ carboxylic acid.

A twenty-fourth aspect which is a method of preparing a catalyst comprising: a) contacting a non-aqueous solvent and a carboxylic acid to form an acidic mixture wherein a volume ratio of non-aqueous solvent to carboxylic acid is from about 1:1 to about 100:1; b) forming a titanium treatment solution by contacting a titanium-containing compound with the acidic mixture of step a); c) contacting a pre-formed silica-support comprising from about 0.1 wt. % to about 20 wt. % water with a chromium-containing compound to form a chrominated support; d) contacting the chrominated support with the titanium treatment solution to form a pre-catalyst; and e) thermally treating the pre-catalyst to form the catalyst.

A twenty-fifth aspect which is a method of preparing a catalyst comprising: a) contacting an alcohol solvent and acetic acid form an acidic mixture wherein a volume ratio of the alcohol solvent to acetic acid is from about 2:1 to about 25:1; b) forming a titanium treatment solution by contacting titanium tetraisopropoxide with the acidic mixture of step a); c) contacting a pre-formed chrominated silica-support with the titanation treatment solution to form a pre-catalyst wherein water evolution occurs when the pre-formed chrominated silica-support is heated within a range of from about 180° C. to about 200° C. under vacuum conditions for a period of time ranging from about 8 hours to about 20 hours; and b) thermally treating the pre-catalyst by heating to a temperature of from about 400° C. to about 1000° C. for a time period of from about 1 minute to about 24 hours to form the catalyst.

While various aspects of the present disclosures have been shown and described, modifications thereof can be made by one skilled in the art without departing from the spirit and teachings of the invention. The aspects of the present disclosures described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an aspect of the present disclosure of the present invention. Thus, the claims are a further description and are an addition to the aspect of the present disclosures of the present disclosure. The discussion of a reference in the present disclosure is not an admission that it is prior art to the present disclosure, especially any reference that may have a publication date after the priority date of this application. The present disclosures of all patents, patent applications, and publications cited herein are hereby incorporated by reference, to the extent that they provide exemplary, procedural or other details supplementary to those set forth herein.

What is claimed is:

1. A method of preparing a catalyst comprising:
   a) contacting a non-aqueous solvent and a carboxylic acid to form an acidic mixture wherein a volume ratio of non-aqueous solvent to carboxylic acid is from about 1:1 to about 100:1, wherein the non-aqueous solvent is an alcohol solvent, a ketone solvent, an ester solvent or combinations thereof;
   b) forming a titanium treatment solution by contacting a titanium-containing compound with the acidic mixture of step a);
   c) contacting a pre-formed chrominated silica-support comprising from about 0.1 wt. % to about 20 wt. % water with the titanium treatment solution to form a pre-catalyst; and
   d) thermally treating the pre-catalyst by heating to a temperature of from about 400° C. to about 1000° C. for a time period of from about 1 minute to about 24 hours to form the catalyst.

2. The method of claim 1 wherein the carboxylic acid comprises a $C_1$ to $C_{15}$ carboxylic acid.

3. The method of claim 1 wherein the carboxylic acid comprises a $C_1$ to $C_{10}$ carboxylic acid.

4. The method of claim 1 wherein the carboxylic acid comprises a $C_1$ to $C_5$ carboxylic acid.

5. The method of claim 1 wherein the carboxylic acid comprises formic acid, acetic acid, propionic acid, or a combination thereof.

6. The method of claim 2 wherein a ratio of moles of carboxylic acid to moles of titanium of the titanium-containing compound is from about 1:1 to about 200:1.

7. The method of claim 1 wherein water evolution occurs when the pre-formed chrominated silica-support is heated within a range of from about 180° C. to about 200° C. under vacuum conditions for a period of time ranging from about 8 hours to about 20 hours.

8. The method of claim 1 wherein the titanium-containing compound comprises a titanium tetraalkoxide.

9. The method of claim 1 wherein the titanium-containing compound comprises titanium ethoxide $Ti(OEt)_4$, titanium isopropoxide $Ti(OiPr)_4$, titanium n-propoxide $Ti(nOPr)_4$, titanium butoxide $Ti(OBu)_4$, titanium 2-ethylhexoxide, or combinations thereof.

10. The method of claim 1
    wherein the carboxylic acid comprises formic acid, acetic acid, propionic acid, or a combination thereof; and
    wherein the titanium-containing compound comprises titanium ethoxide $Ti(OEt)_4$, titanium isopropoxide $Ti(OiPr)_4$, titanium n-propoxide $Ti(nOPr)_4$, titanium butoxide $Ti(OBu)_4$, titanium 2-ethylhexoxide, or combinations thereof.

11. The method of claim 1 wherein the chromium-containing compound comprises chromium trioxide, chromium acetate, chromium nitrate, tertiary butyl chromate, a diarene chromium (0) compound, biscyclopentadienyl chromium (II), chromium (III) acetylacetonate, or combinations thereof.

12. The method of claim 1 wherein the pre-formed silica-support is characterized by a surface area of from about 100 $m^2$/gram to about 1000 $m^2$/and a pore volume of from about 1.0 $cm^3$/gram to about 2.5 $cm^3$/gram.

13. The method of claim 1 wherein an amount of chromium present in catalyst ranges from about 0.01% to about 10% by weight of the catalyst and an amount of titanium present in the catalyst ranges from about 0.01% to about 10% by weight of the catalyst.

14. A method of forming a polymer comprising contacting the catalyst of claim 13 with a monomer under conditions suitable for formation of a polymer and recovering the polymer.

15. The method of claim 14 wherein the monomer comprises an ethylene monomer and the polymer comprises an ethylene polymer.

16. The method of claim 14 wherein the polymer has a high load melt index of from about 1 g/10 min to about 1000 g/10 min, and a shear response of from about 30 to about 1000.

17. The method of claim 14 wherein the polymer has a high load melt index that is from about 3 to about 6 times greater than the high load melt index of a polymer produced by utilizing an otherwise similar catalyst produced in the absence of a titanium treatment solution.

18. A method of preparing a catalyst comprising:
    a) contacting a non-aqueous solvent and a carboxylic acid to form an acidic mixture wherein a volume ratio of non-aqueous solvent to carboxylic acid is from about 1:1 to about 100:1, wherein the non-aqueous solvent is an alcohol solvent, a ketone solvent, an ester solvent or combinations thereof;
    b) forming a titanium treatment solution by contacting a titanium-containing compound with the acidic mixture of step a);

c) contacting a pre-formed silica-support comprising from about 0.1 wt. % to about 20 wt. % water with a chromium-containing compound to form a chrominated support;

d) contacting the chrominated support with the titanium treatment solution to form a pre-catalyst; and e) thermally treating the pre-catalyst to form the catalyst.

19. The method of claim 18 wherein the carboxylic acid comprises formic acid, acetic acid, propionic acid, or a combination thereof; and wherein the titanium-containing compound comprises titanium ethoxide $Ti(OEt)_4$, titanium isopropoxide $Ti(OiPr)_4$, titanium n-propoxide $Ti(nOPr)_4$, titanium butoxide $Ti(OBu)_4$, titanium 2-ethylhexoxide, or combinations thereof.

20. The method of claim 19 wherein a ratio of moles of carboxylic acid to moles of titanium of the titanium-containing compound is from about 1:1 to about 200:1.

* * * * *